United States Patent
Seferiadis et al.

(10) Patent No.: US 11,252,130 B2
(45) Date of Patent: Feb. 15, 2022

(54) SYSTEM AND METHOD FOR DATA SECURITY MANAGEMENT

(71) Applicant: JPMORGAN CHASE BANK, N.A., New York, NY (US)

(72) Inventors: David John Seferiadis, Weekawken, NJ (US); Alexander M. Collins, West New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 362 days.

(21) Appl. No.: 16/289,924

(22) Filed: Mar. 1, 2019

(65) Prior Publication Data

US 2019/0327209 A1 Oct. 24, 2019

Related U.S. Application Data

(60) Provisional application No. 62/639,720, filed on Mar. 7, 2018.

(51) Int. Cl.
*H04L 29/12* (2006.01)
*H04L 29/06* (2006.01)
(Continued)

(52) U.S. Cl.
CPC ............ *H04L 63/0281* (2013.01); *G06F 8/61* (2013.01); *G06F 21/45* (2013.01);
(Continued)

(58) Field of Classification Search
CPC ............. H04L 63/0281; H04L 63/0838; H04L 63/083; H04L 63/20; H04L 61/2007;
(Continued)

(56) References Cited

U.S. PATENT DOCUMENTS 9,420,094 B1 * 8/2016 Keiser ................ G06K 9/00087
10,931,650 B1 * 2/2021 McCown ............ H04L 63/0823
(Continued)

OTHER PUBLICATIONS

CyberArk Application Identity Manager, http://www.cyberark.com (Nov. 2017).
(Continued)

*Primary Examiner* — Khoi V Le
(74) *Attorney, Agent, or Firm* — Hunton Andrews Kurth LLP

(57) ABSTRACT

The invention relates to a computer-implemented system and method for automating the secure deployment of application identity manager (AIM) security agents to ensure integrity of identity assertion during the security sensitive agent installation process, while providing significant cost and time savings in the deployment process. The invention also relates to a command line interface (CLI) to representational state transfer (REST) web services proxy, which provides a standards-based REST web service that interfaces with a Microsoft .NET MVC framework to enable cross platform automation and integration with vault management functions. The invention also relates to a multi-vault management platform comprising a graphical user interface-based portal to manage vault functions across a number of vaults with advanced error handling and process integration.

12 Claims, 10 Drawing Sheets

(51) Int. Cl.
  *G06F 21/45* (2013.01)
  *H04L 61/5007* (2022.01)
  *H04L 61/4511* (2022.01)
  *G06F 8/61* (2018.01)

(52) U.S. Cl.
  CPC ...... *H04L 61/1511* (2013.01); *H04L 61/2007* (2013.01); *H04L 63/0838* (2013.01); *G06F 2221/2117* (2013.01)

(58) Field of Classification Search
  CPC ........ H04L 61/1511; G06F 21/45; G06F 8/61; G06F 2221/2117
  See application file for complete search history.

(56) References Cited

U.S. PATENT DOCUMENTS

2004/0162786 A1* 8/2004 Cross ................ H04L 9/30
  705/59
2017/0118249 A1* 4/2017 Motukuru ............ H04L 63/08

OTHER PUBLICATIONS

CyberArk Data Sheet—Enterprise Password Vault, http://www.cyberark.com (Nov. 2017).

* cited by examiner

```
This XML file does not appear to have any style information associated with it. The document tree is shown below.

▽<ArrayOfPacliCommand xmlns:i="http://www.w3.org/2001/XMLSchema-instance"
  xmlns="http://schemas.datacontract.org/2004/07/PacliProxy.CommandExecution">
  ▽<PacliCommand>
     <command>FILESLIST</command>
   ▽<optionalArguments xmlns:d3p1="http://schemas.microsoft.com/2003/10/Serialization/Arrays">
       <d3p1:string>SESSIONID</d3p1:string>
     </optionalArguments>
   ▽<outputFields xmlns:d3p1="http://schemas.microsoft.com/2003/10/Serialization/Arrays">
       <d3p1:string>NAME</d3p1:string>
       <d3p1:string>INTERNALNAME</d3p1:string>
       <d3p1:string>CREATIONDATE</d3p1:string>
       <d3p1:string>CREATEDBY</d3p1:string>
       <d3p1:string>DELETIONDATE</d3p1:string>
       <d3p1:string>DELETEDBY</d3p1:string>
       <d3p1:string>LASTUSEDDATE</d3p1:string>
       <d3p1:string>LASTUSEDBY</d3p1:string>
       <d3p1:string>SIZE</d3p1:string>
       <d3p1:string>HISTORY</d3p1:string>
       <d3p1:string>ACCESSED</d3p1:string>
       <d3p1:string>LOCKDATE</d3p1:string>
       <d3p1:string>LOCKEDBY</d3p1:string>
       <d3p1:string>FILEID</d3p1:string>
       <d3p1:string>DRAFT</d3p1:string>
       <d3p1:string>RETRIEVELOCK</d3p1:string>
       <d3p1:string>LOCKEDBYGW</d3p1:string>
       <d3p1:string>VALIDATIONSTATUS</d3p1:string>
       <d3p1:string>LOCKEDBYUSERID</d3p1:string>
     </outputFields>
   ▽<outputOptions xmlns:d3p1="http://schemas.microsoft.com/2003/10/Serialization/Arrays">
       <d3p1:string>ALL</d3p1:string>
       <d3p1:string>ENCLOSE</d3p1:string>
       <d3p1:string>RAW</d3p1:string>
       <d3p1:string>OEM</d3p1:string>
     </outputOptions>
   ▽<requiredArguments xmlns:d3p1="http://schemas.microsoft.com/2003/10/Serialization/Arrays">
       <d3p1:string>VAULT</d3p1:string>
       <d3p1:string>USER</d3p1:string>
       <d3p1:string>SAFE</d3p1:string>
       <d3p1:string>FOLDER</d3p1:string>
     </requiredArguments>
   </PacliCommand>
  ▽<PacliCommand>
     <command>ADDRULE</command>
   ▽<optionalArguments xmlns:d3p1="http://schemas.microsoft.com/2003/10/Serialization/Arrays">
       <d3p1:string>ISFOLDER</d3p1:string>
       <d3p1:string>RETRIEVE</d3p1:string>
```

Figure 4

PACLI Web Service Proxy   Home   CommandReference

PACLI Web Service Proxy Command Reference Page

Introduction
The CyberArk PACLI Web Service Proxy API enables cross-platform access to the Windows based PACLI command line interface. Session ID management is handled by the web service so commands with SESSIONID arguments will be denied. All other PACLI commands are supported and require INIT, LOGON and TERM actions as part of session initiation and teardown. ASP restricts some reserved characters, so backslashes can be encoded as !92! (Support for additional escaped characters will be added as needed with the same format of !ASCIINUM!) File upload functions via the PacliStoreFile function allows both form data submission and HTTP header submission of body parameters to make PowerShell scripting easier. The contents and format mirror the api/Pacli function.

PacliStoreFile

| API | Description |
| --- | --- |
| POST api/PacliStoreFile | No documentation available. |

Help

| API | Description |
| --- | --- |
| GET api/Help | No documentation available. |

Pacli

| API | Description |
| --- | --- |
| POST api/Pacli | No documentation available. |

Figure 6

PACLI Web Service Proxy  Home  CommandReference

Help Page Home

GET api/Help

Request Information

URI Parameters
None.

Body Parameters
None.

Response Information

Resource Description

Collection of PacliCommand

| Name | Description | Type | Additional information |
|---|---|---|---|
| command | | string | None. |
| requiredArguments | | Collection of string | None. |
| optionalArguments | | Collection of string | None. |
| outputOptions | | Collection of string | None. |
| outputFields | | Collection of string | None. |

Response Formats

Figure 8

PACLI Web Service Proxy   Home   CommandReference

Help Page Home

POST api/Pacli

Request Information

URI Parameters

None.

Body Parameters

PacliPostContent

| Name | Description | Type | Additional information |
|---|---|---|---|
| vaultCMD | | string | None. |
| vaultFQDN | | string | None. |
| vaultPORT | | string | None. |
| vaultUID | | string | None. |
| vaultPWD | | string | None. |
| sessionID | | string | None. |

Response Formats application/xml, text/xml

Sample:

Figure 9

SYSTEM AND METHOD FOR DATA SECURITY MANAGEMENT

RELATED APPLICATIONS

This application claims priority to U.S. Application No. 62/639,720, entitled "System and Method for Data Security Management," filed Mar. 7, 2018, which is hereby incorporated by reference.

FIELD OF THE INVENTION

The present invention relates generally to data security, and more particularly to a system and method for data security management by automated deployment of security agents, cross-platform management, and multi-vault management functionalities.

BACKGROUND

The information technology (IT) infrastructure deployed by many organizations is a complex network comprising a multitude of different types of systems, software platforms, and databases. For most companies, the task of maintaining and protecting such IT resources, including data that is critical to the business, only continues to grow in importance. Although such software applications and databases within the IT infrastructure require security credentials to be provided for access, it is not uncommon for companies to employ data security practices that are inadequate, leaving their data in a compromised situation. For example, when certain scripts, configuration files, or applications within the company's IT systems are used to access sensitive company databases, the IT staff may elect to hard code credentials into the scripts or applications. Hard coded credentials compromise the security of sensitive databases, as the stored credentials may be unencrypted and may also be accessible to many members of the IT staff. In addition, rotating such credentials using a manual process may impose a significant burden, thus making it more likely that credentials remain unchanged for extended periods of time.

Solutions exist that facilitate some degree of management of credentials, such as CyberArk Enterprise Password Vault and Application Identity Manager. However, in a large organization that requires multiple password vaults and that utilizes a variety of software platforms and operating systems, the process of deploying data security measures may still impose a major burden in terms of time and cost. Accordingly, it would be advantageous to have systems and methods to overcome the foregoing disadvantages.

SUMMARY

According to one embodiment, the invention relates to a computer-implemented system and method for automating the secure deployment of an application identity manager agent, such as the agent offered by CyberArk or other provider. This embodiment of the invention can deploy CyberArk AIM agents or other similar agents leveraging network infrastructure and internal asset repositories to ensure integrity of identity assertion during the security sensitive agent installation process. The automated method can provide significant cost and time savings in the deployment process while maintaining a high level of security A method for secure deployment of an application identity manager (AIM) security agent, according to one embodiment comprises receiving a change request from a user and using a secure request fingerprint validation process to authenticate the change request. The secure request fingerprint validation process comprises the following steps: (a) performing a reverse lookup of a source internet protocol (IP) address from a requesting server with a domain name server (DNS) to return a hostname registered in the DNS; (b) confirming that the hostname returned from the DNS matches a name of the requesting server issuing the change request; (c) confirming that the hostname asserted during the change request made by the user exists in a configuration management database (CMDB); (d) confirming that the hostname asserted during the change request also has an approved change record for AIM security agent installation, as maintained by a change management database; and (e) confirming that a change record for the AIM security agent installation is within a current deployment time window. If all the secure request fingerprint validation process steps are confirmed, the method uses a AIM web service to connect to a server that runs a command line interface proxy to create or reset a client registration passcode. The client registration passcode is then sent to the user making the change request to enable the user to download installation binaries from a distribution point to complete the installation.

According to another embodiment, the invention relates to a Private Ark Command Line Interface ("PACLI") or other command line interface to a Representational State Transfer (REST) web services proxy (referred to herein as the "PACLI Proxy"). The PACLI Proxy provides a standards-based REST web service on top of a Microsoft .NET MVC framework to enable cross platform automation and integration with vault management functions.

According to another embodiment, the invention relates to a multi-vault management platform. The multi-vault management platform comprises a graphical user interface (GUI)-based portal to manage vault functions across any number of vaults and includes advanced error handling, process integration, dash boarding and analytics.

The embodiments described herein can provide significant advantages to a large organization having a multitude of different IT systems, software platforms, databases and password vaults in terms of the efficiency and effectiveness in deploying and managing its data security measures. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 is an example of the PACLI Proxy code according to an exemplary embodiment of the invention.

FIG. 6 is an example of a PACLI web service proxy command reference page according to an exemplary embodiment of the invention.

FIG. 8 is an example of a GET api according to an exemplary embodiment of the invention.

FIG. 9 is an example of a POST api according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Secure Deployment Automation.

Figure 1:
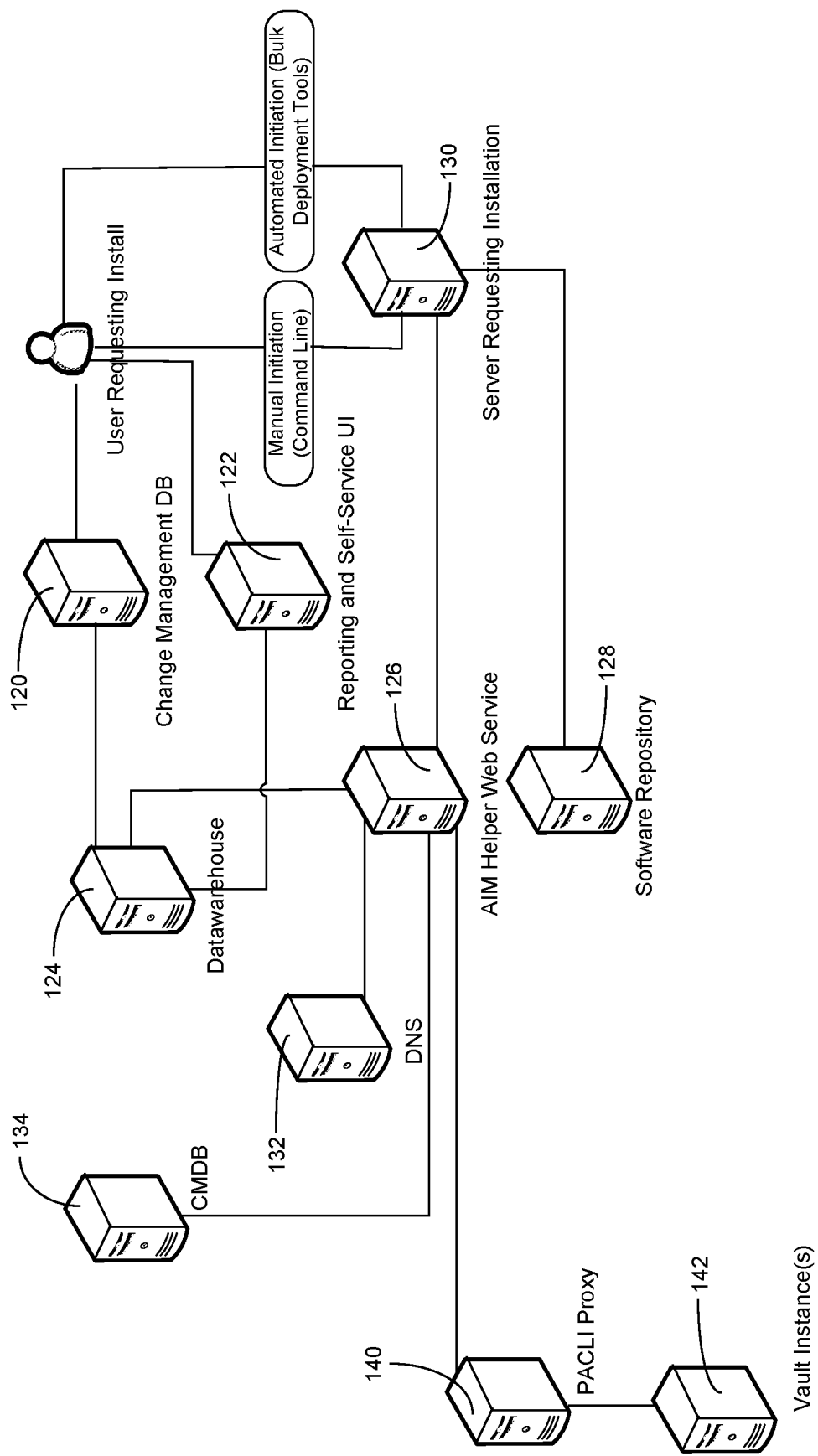
FIG. 1 is a diagram showing an example of a system for automating the secure deployment of CyberArk AIM agents according to an exemplary embodiment of the invention.

Referring to the drawings, FIG. 1 is a diagram of a system for automating the secure deployment of application identity manager (AIM) security agents according to an exemplary embodiment of the invention. This example of the system provides a secure, scalable method of deploying AIM agents leveraging network infrastructure and internal asset repositories to ensure integrity of identity assertion during the security sensitive agent installation process.

As shown in FIG. 1, the system includes a number of servers that are linked via one or more networks, including a change management database 120, a reporting and self-service user interface (UI) server 122, a data warehouse 124, an AIM helper web service server 126, a software repository server 128, an installation requesting server 130, a domain name server (DNS) 132, a configuration management database (CMDB) server 134, a PACLI Proxy server 140, and a vault server 142.

According to an exemplary embodiment of the invention, the AIM secure deployment automation installation procedure can be conducted as follows. First, the user creates a change management request for targeted servers. The change management request includes the list of one or more operating system instances (OSI) hostnames to be targeted with the change management request. The change management system can provide several key security controls for the installation. For example, according to one embodiment: (1) only firm-approved and authorized servers can be referenced, since the change management system only allows servers to be targeted for installation from the central configuration management database (CMDB); (2) the correct approvals are obtained for the deployment of the AIM agent as the change management system enforces the approvers defined in the CMDB approve the deployment; and (3) the authorization for agent registration is time bound by the approved change window included in the change record. Together, the change management integration significantly limits the scope of any potential security vulnerability during the AIM agent enrollment.

Next, the user reviews the reporting and self-service user interface (UI) provided by server 122 to verify pre-deployment. As there may be many customized and advanced methods of installation, the system will automatically determine a 'recommended' installation configuration based on CMDB elements. According to one example, all servers associated with a single application must be co-located on a single CyberArk vault instance. New application installations may need to be installed to a new vault due to capacity constraints and some agents may not have a recommended installation configuration due to missing CMDB reference data. The self-service UI review process allows the end user to confirm accurate installation configurations or select to customize the installation as needed to ensure successful first-time installations. Once the change record has been fully approved and the change window is open (e.g., the change implementation window that was approved has started and has not yet closed), the agent installation can be initiated via automated installation tools, scripts or manually (e.g., by command line interface).

According to an exemplary embodiment of the invention, the AIM helper REST API provided by the AIM Helper Web Service 126 uses a secure request fingerprint to authenticate the request. The secure request fingerprint comprises the following elements according to a preferred embodiment of the invention. A reverse lookup of the source IP address from the requesting server can be performed in the domain name server (DNS) 132 to return the hostname registered in the DNS. The hostname returned from the DNS 132 lookup must match the server name asserted during the install request. In addition, the hostname asserted during the install request made by the user must exist in the configuration management database (CMDB) 134. The hostname asserted during the install request must also have a fully approved change record for AIM agent installation, as maintained by the change management database 120. In addition, the change record for the AIM agent installation must be within the current deployment time window. Ultimately for an attacker to compromise the installation process they would need to compromise multiple distinct elements in the infrastructure at the same time to carry out a successful attack, including: (1) the change management system, (2) the CMDB, (3) the network routing tables and/or IP address allocations/assertions, and (4) the domain naming system (DNS).

If all of the secure fingerprint elements pass validation, the AIM helper web service 126 connects to the PACLI Proxy server 140 to create or reset the client registration passcode. The PACLI Proxy 140, which will be described further below, refers to a Private Ark Command Line Interface to REST web service proxy that can deliver a standards-based REST web service that sits on a Microsoft .NET MVC framework to enable cross-platform automation and integration with vault management functions.

Next, the client passcode and configuration information is returned to the client requesting the installation which is the targeted server in the change management request, and, according to one embodiment, will be running the CyberArk Enterprise Password Vault (EPV) Application Integration Module (AIM) agent. The client password is a temporary one-time use agent registration passcode that securely registers the AIM client with the password vault. Upon initial connection the passcode is immediately invalidated and the agent generates a connection token that continuously changes.

The client then downloads the installation binaries from the firm approved distribution point and completes the installation. According to one embodiment, the installation binaries are the AIM agent code that runs a secure process to communicate with the password vault as well as support secure password queries from application processes running on the target server instances. Installation is completed by the installation logic combining the one-time client passcode and configuration information so the agent knows which vault to register to, the registration settings and the one-time passcode.

Next, log and diagnostic data is sent to the AIM helper web service 126 and logged to the data warehouse 124. Finally, the user reviews the reporting and self-service UI 122 to verify installation and to troubleshoot if needed.

According to one embodiment, a primary advantage that this installation process can provide is that system administrators do not need to submit a pre-installation request to obtain agent configuration information, nor do they need to call the support desk during installation to obtain the one-time agent registration passcode. The process can support an unlimited number automated installations with no manual intervention saving considerable time, while also supporting ad-hoc repair or troubleshooting of agents (e.g., agents that are not working properly can easily be uninstalled and reinstalled). According to one embodiment, there is also no human interaction with the one-time agent registration passcode, which significantly improves the security posture of the agent infrastructure, as a compromise of that registration passcode could open the vault to social engineering attack.

PACLI Proxy.

According to another embodiment, the invention provides a PACLI command line to REST web services proxy ("PA-CLI Proxy"). The PACLI Proxy can deliver a standards-based REST web service on top of Microsoft .Net MVC framework to all cross platform automation and integration with vault management functions. According to other embodiments, the proxy can be provided for any legacy command line application programming interface (API). The advantageous features of the PACLI Proxy, which can generally be adapted for use with any legacy command line API, is that developers can use REST API calls that are available across virtually any programming language and platform. The PACLI proxy abstracts and simplifies key elements for the REST functionality including secure session management and multi-tenancy (e.g., The PACLI Proxy server can support multiple sessions for multiple different users at the same time with different security contexts).

The proxy combines multiple command line functions into simplified interactions, such as providing column header information in command output by running the 'help' command to first obtain column output documentation and then combining this with the output of a requested command, thus saving the user from making two separate API calls and combining the results. The Proxy code is a combination of a .NET MVC application running on Microsoft Internet Information Server (IIS) which connects to a Windows based shell command line API, such as the CyberArk Private Ark Command Line Interface (PACLI). According to this example, the PACLI client is a series of Windows binaries that run on a Windows server and are able to communicate to the CyberArk Enterprise Password Vault (EPV) via the proprietary Private Ark protocol.

Figure 2:
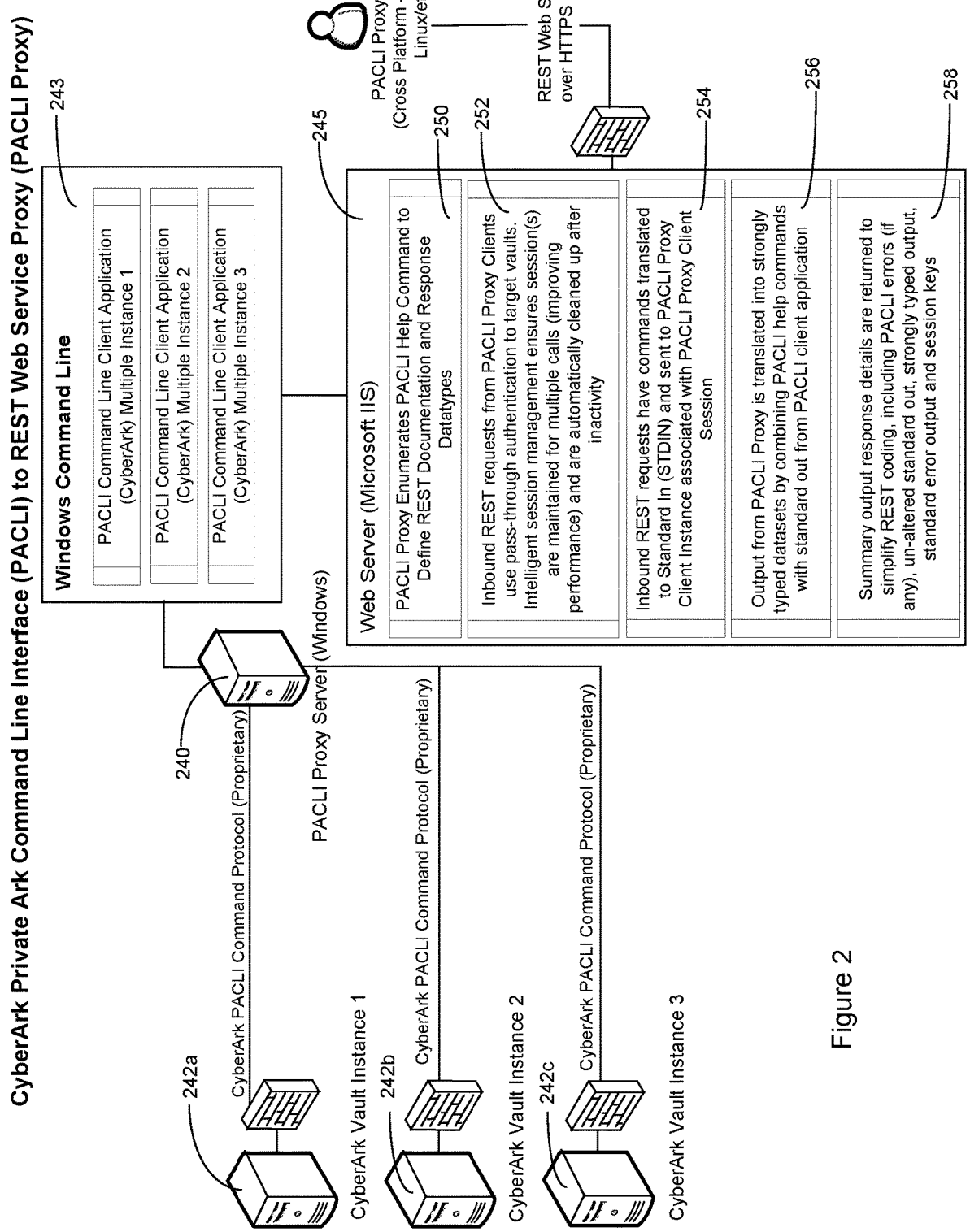
FIG. 2 is diagram showing an example of a PACLI Proxy system according to an exemplary embodiment of the invention.

FIG. 2 illustrates the PACLI Proxy server 240 and its operation according to an exemplary embodiment of the invention. As shown in FIG. 2, a large organization may utilize several CyberArk vault instances 242*a*, 242*b*, and 242*c*. The PACLI Proxy server 240 interfaces with each of these CyberArk vault instances and also with a Windows command line application 243. Also shown in FIG. 2, the Windows command line application 243 interfaces with a Microsoft Internet Information Services (IIS) web server 245.

In the Microsoft IIS web server 245, the PACLI Proxy enumerates a PACLI help command to define REST documentation and response datatypes in step 250.

Inbound REST requests from PACLI Proxy clients use pass-through authentication to target vaults in step 252. Intelligent session management ensures session(s) are maintained for multiple calls thus improving performance, and are automatically cleaned up after inactivity. The session management also supports multiple security contexts of multiple separate users and segregates traffic, so a user with basic read-only entitlements can use the PACLI Proxy at the same time as a user with read-write entitlements.

In step 254, inbound REST requests have commands translated to Standard In (STDIN) and are sent to the PACLI Proxy client instance associated with the PACLI Proxy client session.

In step 256, output from the PACLI Proxy is translated into strongly typed datasets by combining PACLI help commands with standard output from the PACLI client application.

In step 258, summary output response details are returned to simplify REST coding, including PACLI errors, if any, unaltered standard output, strongly typed output, standard error output, and session keys.

The foregoing features enable the PACLI Proxy clients to issue REST service calls using an HTTPS format across platforms, such as Windows, Linux, etc.

Figure 3:
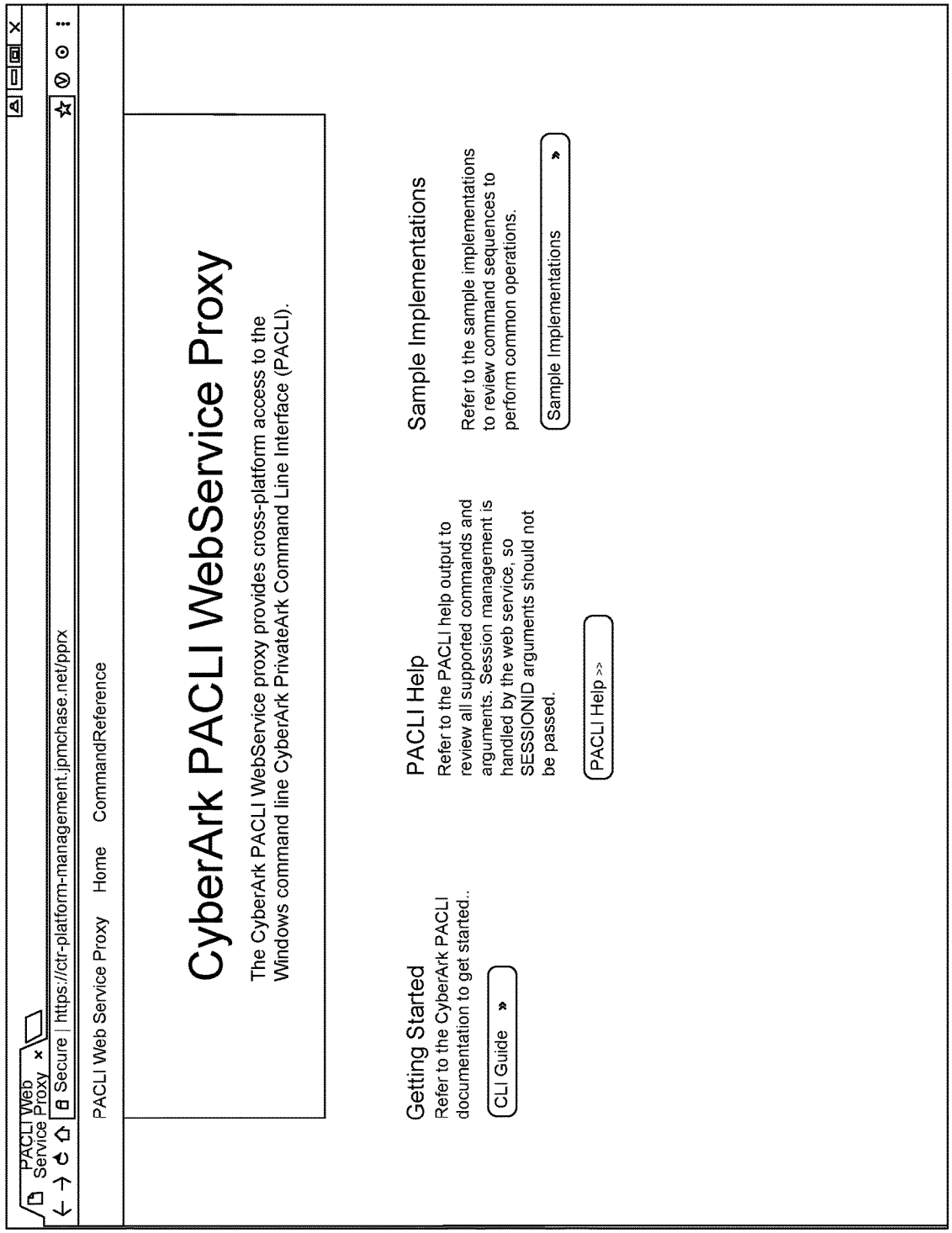
FIG. 3 is an example of a screen shot showing a user interface to the PACLI Proxy according to an exemplary embodiment of the invention.

FIG. 3 illustrates a user interface (UI) for the PACLI Proxy according to one embodiment of the invention. As shown in FIG. 3, the UI provides access to PACLI documentation, PACLI help files, and sample implementations. The PACLI help files provide access to all supported commands and arguments. The sample implementations provide examples of command sequences to perform common operations.

FIG. 4 provides an example of the PACLI Proxy code according to an exemplary embodiment of the invention. This figure shows an example of a strongly typed API response in XML format that has been translated from the PACLI windows command line API. This specific command is the 'help' command that PACLI uses to provide a list of all supported commands and the response columns and data types.

Figure 5:
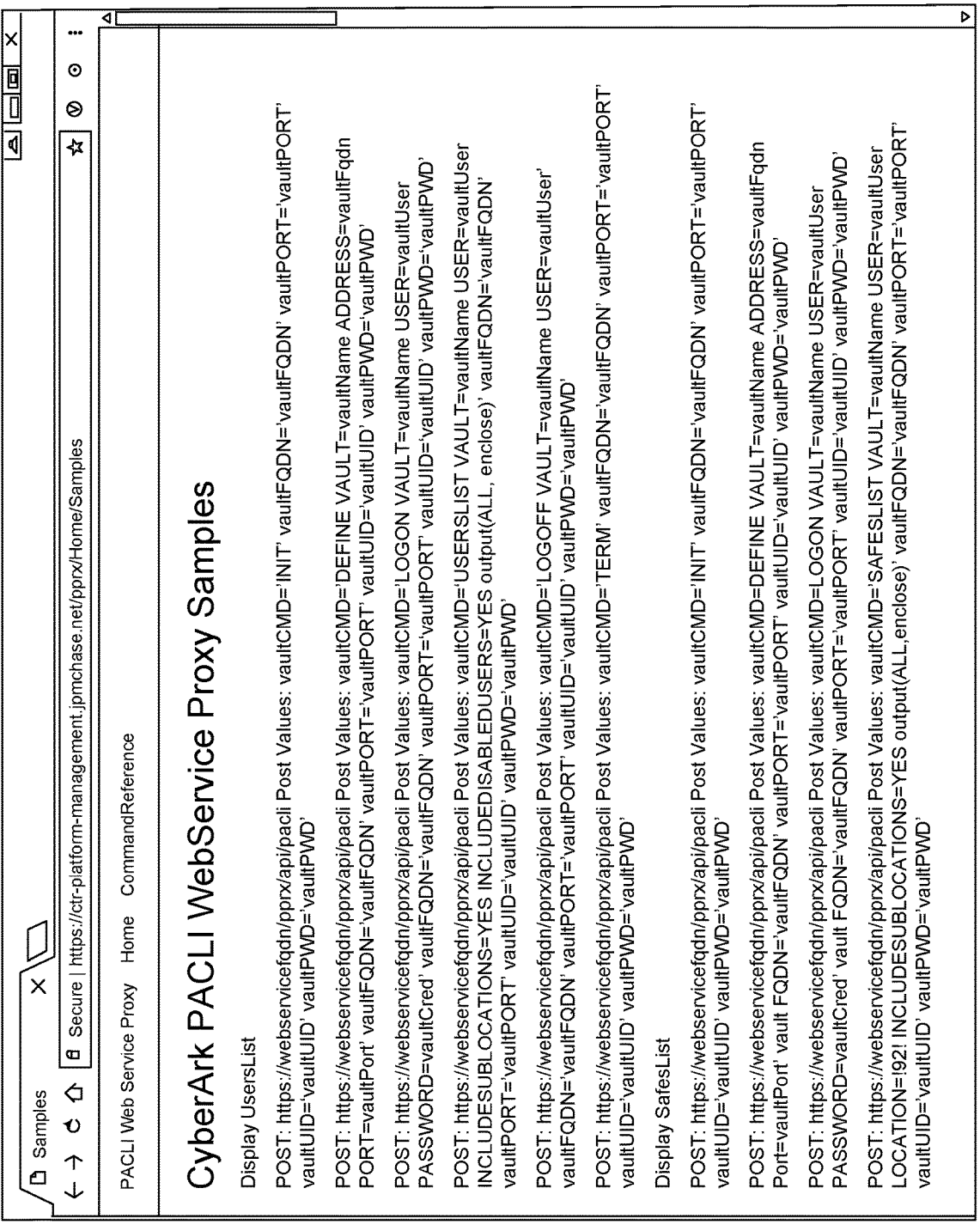
FIG. 5 is an example of commands available with the PACLI Proxy according to an exemplary embodiment of the invention.

FIG. 5 illustrates examples of PACLI Proxy commands according to an exemplary embodiment of the invention. This figure displays a series a common steps and functions that a programmer would use to interact with the PACLI Proxy API. This provides a quick-start guide for programmers.

FIG. 6 illustrates an example of a PACLI Proxy command reference page according to an exemplary embodiment of the invention. The CyberArk PACLI web service proxy API enables cross-platform access to the Windows based PACLI command line interface. SessionID management is handled by the web service so commands with SESSIONID arguments will be denied. According to an exemplary embodiment of the invention, all other PACLI commands are supported and require INIT, LOGON and TERM actions as part of session initiation and teardown. ASP restricts some reserved characters, so backslashes can be encoded as !92! for example. Support for additional escaped characters can be added as needed with the same format of !ASCIINUM!. File upload functions via the PacliStoreFile function allows both form data submission and HTTP header submission of body parameters to make PowerShell scripting easier. The contents and format mirror the api/Pacli function according to one embodiment of the invention.

Figure 7:
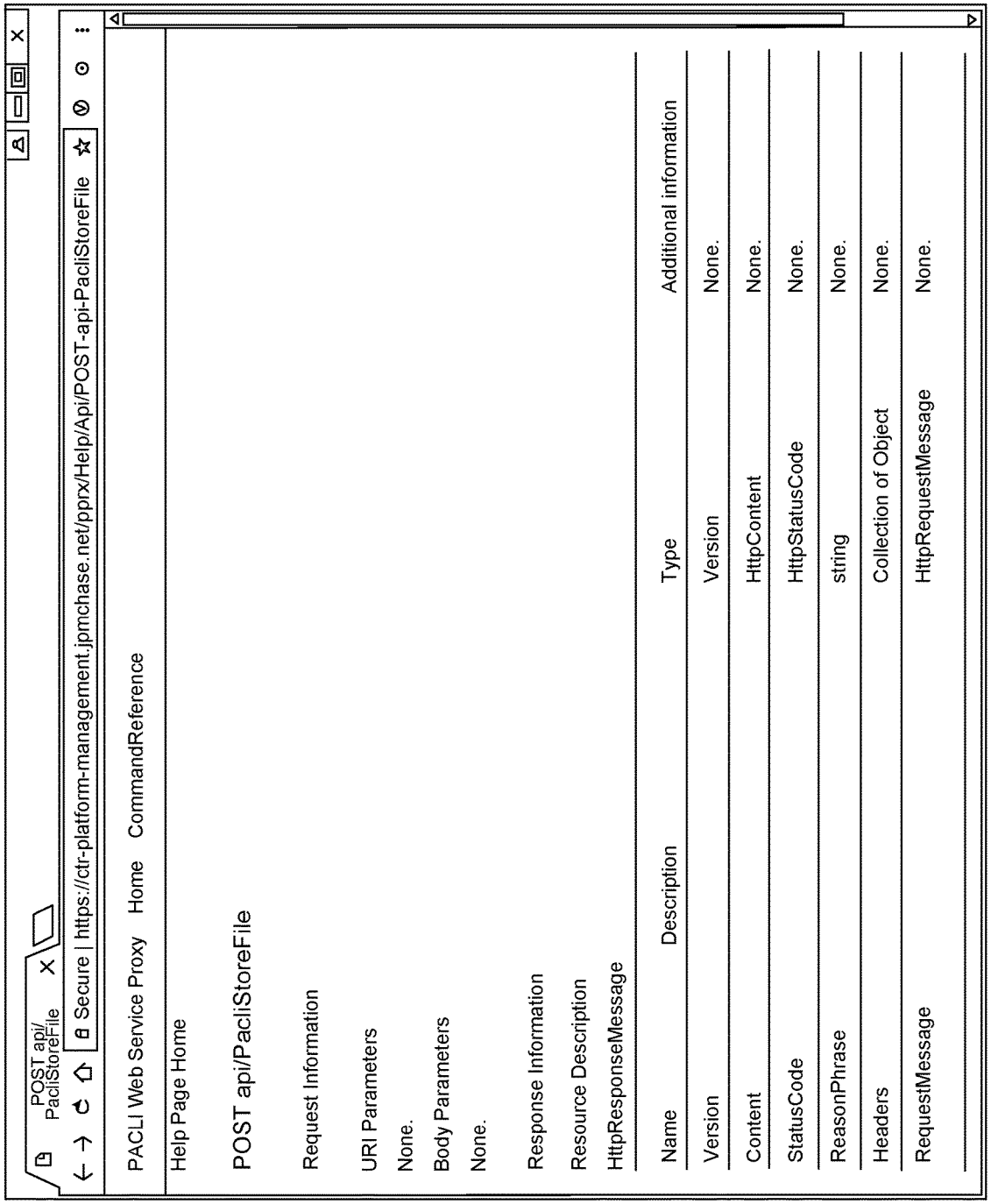
FIG. 7 is an example of a POST api according to an exemplary embodiment of the invention.

FIG. 7 illustrates an example of a POST api/PacliStoreFile command according to an exemplary embodiment of the invention. This documentation provides data types and available functions to the programmer writing REST API calls to upload files to the CyberArk Enterprise Password Vault.

FIG. 8 illustrates an example of a GET api/Help command according to an exemplary embodiment of the invention. This documentation provides data types and fields returned from the help function. This is a read-only function.

FIG. 9 illustrates an example of a POST api/Pacli command according to an exemplary embodiment of the invention. This documentation provides data types and fields for the REST API programmer to call and utilize the PACLI Proxy API and execute a PACLI command.

Super PACLI.

According to another embodiment, the invention relates to a Multi-Vault Management Platform. With a large organization, a deployment of a password vault application such as CyberArk can be so large that multiple vaults are needed to scale to the organization's workload. According to this example, CyberArk does not provide any mechanism to manage multiple vaults; consequently, significant management overhead is required. According to an exemplary embodiment of the invention, the multi-vault management platform described herein is a graphical user interface (GUI) based portal that allows a user to manage vaults functions across any number of vaults and includes advanced error handling, process integration, dash boarding and analytics.

Figure 10:
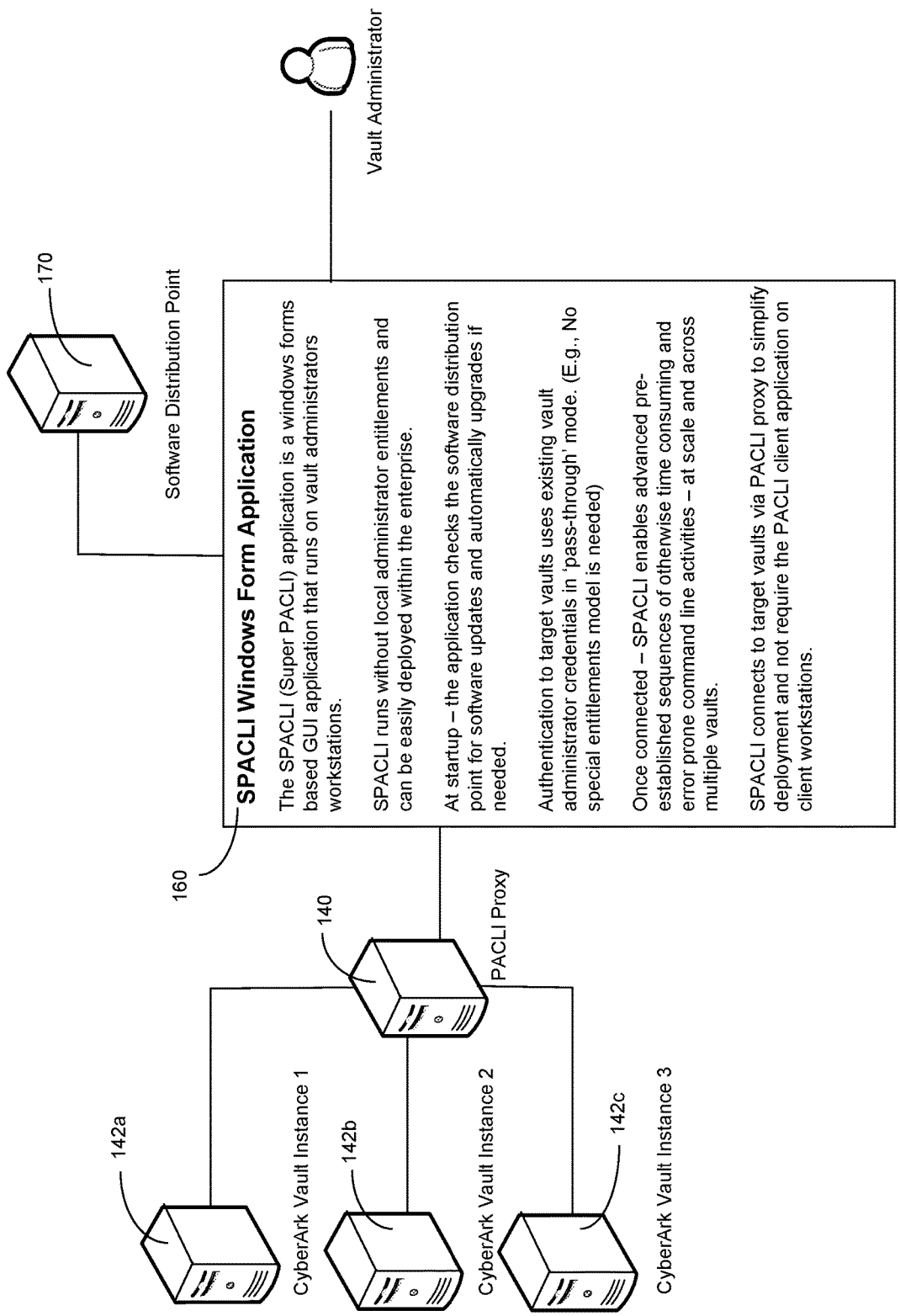
FIG. 10 is diagram showing an example of a system for multi-vault management via PACLI, or Super PACLI, according to an exemplary embodiment of the invention.

FIG. 10 is a diagram illustrating a system for multi-vault management via PACLI (referred to as "Super PACLI" or "SPACLI") according to an exemplary embodiment of the invention. Super PACLI can provide both a central point of management for any number of CyberArk vault instances and significant time savings, security and cost savings to an organization. Super PACLI allows for organizational standards and rules to be enforced so that vault administrators cannot perform unauthorized or non-standard functions. It summarizes multiple command line actions into a single logical step for the administrator, and also removes direct access to the vault thus improving security posture.

As shown in FIG. 10, the SPACLI application 160 is a Windows forms based GUI application that runs on vault administrators' workstations. SPACLI can run without local administrator entitlements and can be easily deployed within the enterprise. At startup, the SPACLI application checks the software distribution point 170 for software updates and automatically upgrades if needed. Authentication to target vaults uses existing vault administrator credentials in 'pass-through' mode, e.g., no special entitlements model is needed. Once connected, SPACLI enables advanced pre-established sequences of otherwise time consuming and error prone command line activities—at scale and across multiple vaults. SPACLI connects to target vaults (e.g., vault instances 142a, 142b, and 142c) via the PACLI Proxy 140 to simplify deployment and not require the PACLI client application on client workstations.

Although the foregoing examples have been described in connection with application identity manager agents and password vaults provided by CyberArk, those skilled in the art will appreciate that various embodiments of the present invention can be implemented with similar solutions provided by other entities, and are not limited to CyberArk.

As described above, the systems and methods of exemplary embodiments of the invention may comprise one or more computing devices, such as servers and personal computers, and one or more networks that connect the various computing devices shown in the Figures. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

Although examples of servers' devices are shown in the Figures, exemplary embodiments of the invention may utilize other types of communication devices whereby a user may interact with a network that transmits and delivers data and information used by the various systems and methods described herein. Personal computing devices that may be used by IT staff to interact with the various servers include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices may include various connections such as a cell phone connection, WiFi connection, Bluetooth connection, satellite network connection, and/or near field communication (NFC) connection, for example.

As described above, the Figures depict a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of user interfaces may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for secure deployment of at least one application identity manager (AIM) security agent, the method comprising:
   generating, by a requesting server, a change request for installation of at least one AIM security agent, to obtain secure access credentials to one or more computing resources associated with an information technology (IT) system;
   authenticating, by an AIM helper web server, the change request, using a secure request fingerprint validation process, wherein the secure request fingerprint validation process comprises:
      verifying a source internet protocol (IP) address and a hostname of the requesting server asserted in the change request message using a domain name server (DNS); and
      confirming that the hostname asserted in the change request exists in a configuration management database (CMDB) and an approved change record for the installation of at least one AIM security agent on the requesting server exists on a change management server, wherein an approval for the installation of the at least one AIM security agent on the requesting server is obtained, by the change management server, based on information defined in the CMDB;
   connecting, by the AIM helper web server, to a command line interface (CLI) based web service proxy to create a one-time temporary registration passcode for the AIM client agent running on the requesting server, based on successful completion of the secure request fingerprint validation process;
   sending the one-time temporary registration passcode to the requesting server, the one-time temporary registration passcode being used by the requesting server to securely register the AIM client agent with a selected password vault instance from a plurality of password vault instances accessible via the CLI-based web service proxy, wherein the selected password vault instance is determined by combining information associated with the AIM client agent configuration and the one-time temporary registration passcode; and
   generating, by the AIM client agent, a continuously changing connection token for maintaining secure communication with the selected password vault, wherein the one-time temporary registration passcode is invalidated after registering the AIM client agent with the selected password vault instance using the one-time temporary registration passcode.

2. The method of claim 1, wherein the CLI-based web service proxy delivers a standards-based representational state transfer (REST) web service on top of a Microsoft .NET MVC framework.

3. The method of claim 1, wherein the one-time temporary registration passcode enables the requesting server to download one or more installation binaries comprising an AIM security agent code that runs a secure process for communicating with a selected password vault instance and supporting secure password queries from one or more application processes on the requesting server.

4. The method of claim 2, wherein the CLI-based web service proxy enables a user to use REST API calls that are available across a plurality of computer programming languages.

5. The method of claim 4, wherein the CLI-based web service proxy provides secure session management and pass-through authentication.

6. The method of claim 1, further comprising: using a super command line interface proxy to manage a plurality of password vaults, wherein the super command line interface proxy enforces organizational standards and rules so that vault administrators cannot perform unauthorized or non-standard functions.

7. A computer-implemented system for secure deployment of at least one application identity manager (AIM) security agent, the system comprising:
an electronic memory; and
a computer processor, wherein the computer process is programmed to:
generate, by a requesting server, a change request for installation of at least one AIM security agent, to obtain secure access credentials to one or more computing resources associated with an information technology (IT) system;
authenticate, by an AIM helper web server, the change request, using a secure request fingerprint validation process, wherein the secure request fingerprint validation process comprises:
verifying a source protocol (IP) address and a hostname of the requesting server asserted in the change request message using a domain name server (DNS); and
confirming that the hostname asserted in the change request exists in a configuration management database (CMDB) and an approved change record for the installation of at least one AIM security agent on the requesting server exists on a change management server, wherein an approval for the installation of the at least one AIM security agent on the requesting server is obtained, by the change management server, based on information defined in the CMDB;
connect, by the AIM helper web server, to a command line interface (CLI) based web service proxy to create a one-time temporary registration passcode for the AIM client agent running on the requesting server, based on successful completion of the secure request fingerprint validation process;
send the one-time temporary registration passcode to the requesting server, the one-time temporary registration passcode being used by the requesting server to securely register the AIM client agent with a selected password vault instance from a plurality of password vault instances accessible via the CLI-based web service proxy, wherein the selected password vault instance is determined by combining information associated with the AIM client agent configuration and the one-time temporary registration passcode; and
generate, by the AIM client agent, a continuously changing connection token to maintain secure communication with the selected password vault, wherein the one-time temporary registration passcode is invalidated after the AIM client agent is registered with the selected password vault instance using the one-time temporary registration passcode.

8. The system of claim 7, wherein the CLI-based web service proxy delivers a standards-based REST web service on top of a Microsoft .NET MVC framework.

9. The system of claim 7, wherein the one-time temporary registration passcode enables the requesting server to download one or more installation binaries comprising an AIM security agent code that runs a secure process to communicate with a selected password vault instance and to support secure password queries from one or more application processes on the requesting server.

10. The system of claim 8, wherein the CLI-based web service proxy enables a user to use REST API calls that are available across a plurality of computer programming languages.

11. The system of claim 10, wherein the CLI-based web service proxy provides secure session management and pass-through authentication.

12. The system of claim 7, wherein the computer processor is further programmed to use a super command line interface proxy to manage a plurality of password vaults, wherein the super command line interface proxy enforces organizational standards and rules so that vault administrators cannot perform unauthorized or non-standard functions.

* * * * *